(12) United States Patent
Thomas et al.

(10) Patent No.: US 8,464,353 B2
(45) Date of Patent: Jun. 11, 2013

(54) METHOD AND SYSTEM FOR CONTENT DOWNLOADS VIA AN INSECURE COMMUNICATIONS CHANNEL TO DEVICES

(75) Inventors: David Andrew Thomas, Atherton, CA (US); Puneet Sharma, Palo Alto, CA (US); Sujata Banerjee, Sunnyvale, CA (US); Sung-Ju Lee, Los Altos, CA (US); Amy Csizmar Dalal, Northfield, MN (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1804 days.

(21) Appl. No.: 10/679,092

(22) Filed: Oct. 3, 2003

(65) Prior Publication Data

US 2005/0076210 A1   Apr. 7, 2005

(51) Int. Cl.
*H04L 29/06* (2006.01)

(52) U.S. Cl.
USPC .................................. 726/27; 726/28; 705/53

(58) Field of Classification Search
USPC ... 713/171, 187, 165; 726/26–33; 705/77–79, 705/50–54
See application file for complete search history.

(56) References Cited

U.S. PATENT DOCUMENTS

| | | | | |
|---|---|---|---|---|
| 5,255,182 A * | 10/1993 | Adams | ............................ | 705/17 |
| 5,850,446 A * | 12/1998 | Berger et al. | .................... | 705/79 |
| 6,148,405 A * | 11/2000 | Liao et al. | ......................... | 726/2 |
| 6,226,618 B1 * | 5/2001 | Downs et al. | ...................... | 705/1 |
| 6,385,596 B1 * | 5/2002 | Wiser et al. | ..................... | 705/51 |
| 6,868,402 B1 * | 3/2005 | Hirota et al. | .................... | 705/40 |
| 7,165,181 B2 * | 1/2007 | Brickell | ........................ | 713/182 |
| 2002/0027994 A1 * | 3/2002 | Katayama et al. | ............ | 380/269 |
| 2002/0064283 A1 * | 5/2002 | Parenty | ......................... | 380/277 |
| 2002/0112152 A1 * | 8/2002 | VanHeyningen et al. | ...... | 713/151 |
| 2003/0194988 A1 * | 10/2003 | Knox | ............................ | 455/406 |
| 2004/0198220 A1 * | 10/2004 | Whelan et al. | ............... | 455/41.1 |
| 2005/0050208 A1 * | 3/2005 | Chatani | ......................... | 709/229 |

* cited by examiner

*Primary Examiner* — Benjamin Lanier (57) ABSTRACT

The present teachings provide for a method and system for facilitating content download to one or more remote devices via an insecure communication channel. The method comprises the steps of receiving at least one shared secret from a device via an insecure communications channel, each shared secret encoded and functioning as an identifier for the device, transmitting an encrypted file, from a file server, to the device associated with the encoded shared secret, receiving the shared secret in a plaintext forma via a secure communications channel, receiving a confirmation authorizing the release of a decryption key, and sending a decryption key corresponding to the transmitted file, for which the authorization for the release of the decryption key has been received. The decryption key is encrypted using the shared secret if transmission is via the insecure channel.

27 Claims, 7 Drawing Sheets

METHOD AND SYSTEM FOR CONTENT DOWNLOADS VIA AN INSECURE COMMUNICATIONS CHANNEL TO DEVICES

FIELD OF THE INVENTION

The present teachings relates to the field of communications systems. More particularly, the present teachings relates to methods and systems for paying for downloads of digital content to portable computing devices.

BACKGROUND

The transactions involving the sale and transfer of electronic content to various user devices is becoming a more significant problem because this medium of exchange is gaining popularity and acceptance. Because these transactions are conducted at arms length, overcoming the issue of trust between the parties is important. Additionally, the problem of establishing a secure communication channel between the parties is important.

One existing scheme involves the download of electronic content through the Internet, and payment and receipt of a decryption key made over a second channel such as a telephone or fax. However, in this scheme, the user has to personally identify himself and receive the decryption key. Neither the payment information nor the decryption key could be transmitted through the first channel because the first channel of communication is assumed not to be secure.

In other schemes of the sort, a single communication channel is used between the content server and the client. However, in these systems, the problem of trust remains a primary concern. A user (client) is reluctant to pay for content it has not yet received, and the seller is reluctant to authorize the transfer or download of the electronic content without having received payment.

Since in a typical transaction, credit card details necessary for the payment may be transmitted over the same channel as the electronic content transfer, a secure means for the transmission of both payment information as well as the digital content is a must. In one prior art scheme, based on a secured sockets layer (SSL) protocol, transfer of credit card requires the payment processing server to have a certificate that a client could verify.

Some of the existing schemes for transacting over the Internet are based on the use of secret key cryptography. However, secret key cryptography requires that the parties involved in the transaction know each other prior and/or somehow communicate the secret decryption key or keys to one another, in order to complete the transaction. Alternative approaches use a public/private key cryptography. However, these processes require as a first step, the verification of the identity of both parties. This requires certificates and hence a certificate authority. However, under some scenarios of content transfer based on a serendipitous purchases, the requirement of obtaining a certification may be onerous and/or impractical. Additionally, one party has to obtain the public key through some intermediary channel.

SUMMARY OF THE INVENTION

The teachings of the present invention solve the problem of securely transferring files to a remote device, particularly a mobile device. The electronic content is transferred in an encrypted form which the recipient cannot use until her identity (and payment) have been verified. According to the teachings of the present invention, the mobile device identifies the user, and this identity (and payment) is verified though another communication channel.

A representative embodiment of the present invention provides a system for facilitating content downloads via an insecure communications channel. The system comprises a content server stores a plurality of content files, and can wirelessly transmit the content files via an insecure channel, and communicates with a secure channel, one or more devices that transmit and receive communications to and from the content server over the insecure channel including any one of the content files in encrypted form, each device includes a processor to manage the communications as well as encryption and decryption of communicated data. The system also includes a point of sale terminal that communicates with a user associated with any of the devices, and a payment server that communicates with both the point of sale terminal and the content server, via the secure channel, and provides a shared secret in plaintext form via the secured channel from the user to the content server. The content server releases a decryption key to one of the devices upon receipt of confirmation from the payment server that the user of the device accepted terms of download and decryption of a content file. The content server encrypts the decryption key for security using the shared secret provided by the device.

Another representative embodiment of the present invention includes a method facilitating content downloads via an insecure communications channel. The method comprises receiving from a device via an insecure communications channel at least one shared secret in encoded form that functions as an identifier of the device. Next the content server transmits encrypted content via the insecure communications channel to the device. The content server receives the shared secret in plaintext form via a secure communications channel and after receiving a confirmation authorizing release of a decryption key; it sends the decryption key for decryption of the encrypted content. The decryption key is encoded using the shared secret if the transmission of the key is via the insecure communications channel.

An alternative embodiment of the present invention includes a method for downloading content from a content server over an insecure communications channel, comprising, sending a shared secret in an encoded form to a content server via an insecure communications channel, downloading from the content server an encrypted content via the insecure communications channel, sending an encoded content download confirmation value to the content server via the insecure communications channel, receiving a decryption key in an encrypted form from the content server via the insecure channel, wherein the decryption key is encrypted using the shared secret, decrypting the downloaded decryption key using the shared secret, decrypting the downloaded encrypted content using the decryption key, and sending an acknowledgement of the received decryption key.

Yet another embodiment of the present invention includes a method for authorizing a release of a decryption key corresponding to a downloaded content. The method comprises, receiving from a user via a secure channel a shared secret in a plaintext form, sending the shared secret to a content server, receiving a confirmation of successful encrypted content download from the content server, prompting the user to accept terms of download and decryption of the encrypted content, and after receipt of an indication of such acceptance, sending an authorization to the content server to release a decryption key for decrypting the downloaded encrypted content.

BRIEF DESCRIPTION OF THE DRAWINGS

The accompanying drawings, which are incorporated in and form a part of this specification, illustrate embodiments of the teachings and, together with the description, serve to explain the principles of the teachings. Throughout the drawings, the same callout numbers are used to describe the same or similar elements.

DETAILED DESCRIPTION OF THE PREFERRED EMBODIMENTS

Among other things, the approach in accordance with the teachings of the present invention aid consumers in the download and purchase of digital content for use on mobile devices, including personal digital assistants (PDAs), or other portable devices. In the discussion to follow, the term "PDA" will be used to represent all manner of communication devices including wireless communications and computing devices.

Moreover, the present teachings may be applied to hotspot situations to download and pay for digital content. A hotspot is, for example, any locale with an accessible wireless network, wherein hotspots may be distributed throughout a region. For example, a hotspot may exist at a gas station, a coffee shop or a convenience store. In a general implementation of the present teachings, no assumptions as to the security of the hotspot's local wireless network is necessary. Additionally, various implementations of the teachings of the present invention do not require third party certification to provide a secure communication channel.

Figure 1:
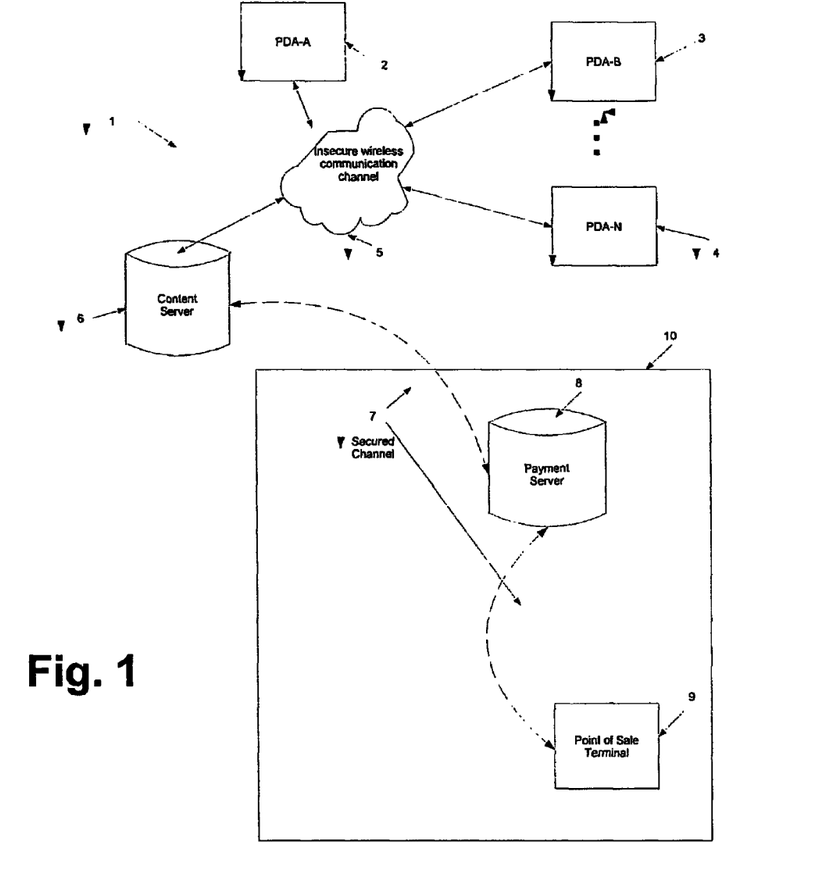
FIG. 1 is an illustration of one embodiment of a communication and content transfer system.

FIG. 1 depicts one embodiment of a system implemented according to the present teachings. As shown in FIG. 1, a plurality of PDA's may be within the range of a particular hotspot 1 at any given time period. Each PDA 2-4 is configured to wirelessly communicate with the file or content server 6 through the wireless local network 5. The wireless communication channel 5 is presumed to be an insecure channel because it is vulnerable to intruder's snooping. The terms file server or content server will be used interchangeably throughout this document. For proper operation, each PDA 2-4 must therefore be able to identify a wireless access point and subsequently communicate with it. In an implementation of the present invention, each of the PDAs 2-4 is configured to continually seek access points, and when one is encountered, each PDA 2-4 is further configured to attempt to gain access to the network provided by such access point. Moreover, in an implementation of the present invention, upon finding an access point, each PDA 2-4 invokes a DHCP protocol to acquire an IP address. The PDAs 2-4 can further be configured to obtain other networking information suitable for the access point, such as a default gateway.

Upon entry into the hotspot region 1, the PDA 2 receives from a list of available access points (APs). From this list, PDA 2 chooses an access point (also referred to as AP). Having chosen an AP, PDA 2 binds to its associated channel.

In an implementation of the present invention, PDA 2 acquires an IP address via DHCP. PDA 2 then starts a background daemon which probes the network for media file download service such as provided by content server 6. The process by which a PDA would locate and establish communication with the content server 6 is described in further detail in the related applications, entitled "Method and system for transferring video and audio files to portable computing devices," and "Method and system for file downloads to portable computing devices," both by the same inventors, filed on the same date as the present invention, and incorporated herein by reference.

The representative PDA, e.g. PDA 2 may be a thin-client PDA with specialized functionalities limited to practice at a minimum the present teachings. Alternatively, the PDA 2 may be a thick-client PDA with enhanced functionalities, including enhanced memory and processing capabilities.

As previously mentioned, upon establishing communication with the file server, the PDA 2 may use a background daemon to probe for media download services offered by the hotspot network. In one exemplary embodiment of the present invention, the content server 6 may offer a selection of movie titles or other media files for download. The selection of a particular title or file may be based on a pre-selected list of interesting or desired titles, pre-loaded into the PDA by the client-user. In an alternative embodiment, the content server 6 may make available and start the download of a particular file onto the PDA 2 based on marketing profiles, and/or consumer interest information related to the particular user. In an alternative embodiment, the user may simply be prompted to select a download from a list of available titles. The particular means by which a file is selected prior to download are further described in the two related applications mentioned above. The method by which a file is selected for download has no direct effect upon the implementation of the teachings of the present invention.

Additionally, according to the teachings of the present invention, in certain implementations, files residing on the content server 6 may include media files having a video and audio components, separable into their components and transferable to the PDA at different times. Alternatively, the video portion of the file may be downloaded via another channel, at another time, such as downloading the video using a home computer, over a broadband connection. This scheme offers the convenience of only having to download the audio file corresponding to the designated file, upon entry into the hotspot. Since the audio file is generally much smaller than the video file, the user would have to spend a much shorter time in the hotspot to have a complete download.

In some implementations of the present invention, the encrypted file may be a media file, including both audio and video components. In alternative embodiments, the video file which is in most cases much larger than the audio file may have been downloaded at a previous time and location, such as at the user's home, using a broadband Internet connection. This way, the audio download may take a significantly shorter time to download, specially if the communication channel is based on 802.11 bandwidth.

In yet another embodiment, the video and/or audio file may be downloaded to the PDA 2 over several download sessions, each at a different hotspot stop. The various file methods of file transfer are described in further details in the related applications mentioned above.

As further shown in FIG. 1, the content server 6 is also in communication with a payment server 8, through a secure channel 7. In one implementation of the present invention, the secure channel 7 may be established through a land-line such as a telephone wire, or underground cabling. Because of the nature of land-line based communications, it offers additional protection against third parties who may be attempting to capture the communication by snooping.

In one embodiment of the present invention, the payment server 8 may be configured to confirm a completed file download. In an alternative implementation, the payment server 8 receives a successful file download confirmation or authentication from the payment server 8. The content server 6 alone or in conjunction with the payment server 8 may perform the successful file download confirmation by one of many schemes, including methods based on a challenge-response algorithm or an MD5 checksum algorithm. An exemplary embodiment based on using an MD5 checksum routine is described in further detail in the related applications mentioned above.

Referring back to FIG. 1, a point of sale terminal 9 is in communication with the payment server 8, and directly or indirectly in communication with content server 6. In one implementation of the teachings of the present invention, the payment server 8 may be part of the same physical machine as the point of sale terminal server 9, and comprise logical system 10. In an alternative embodiment, both the payment server 8 and the point of sale terminal 9 may reside on the same physical system as the content server 6. The point of sale terminal 9 is configured to accept and process payment from a user, and transmit confirmation of the receipt of payment to the content server 6. As further described below, the payment server 8 operating in conjunction with a point of sale (POS) terminal 9, obtains the credit card information used for the payment, and that information is forwarded to the content server 6, via the secure channel 7, in an unencoded or plain text form. In at least one embodiment, when the user makes a cash payment, an alternative identifier or "shared secret" may be used and transmitted to the content server 6. This process is further described below.

Figure 2:
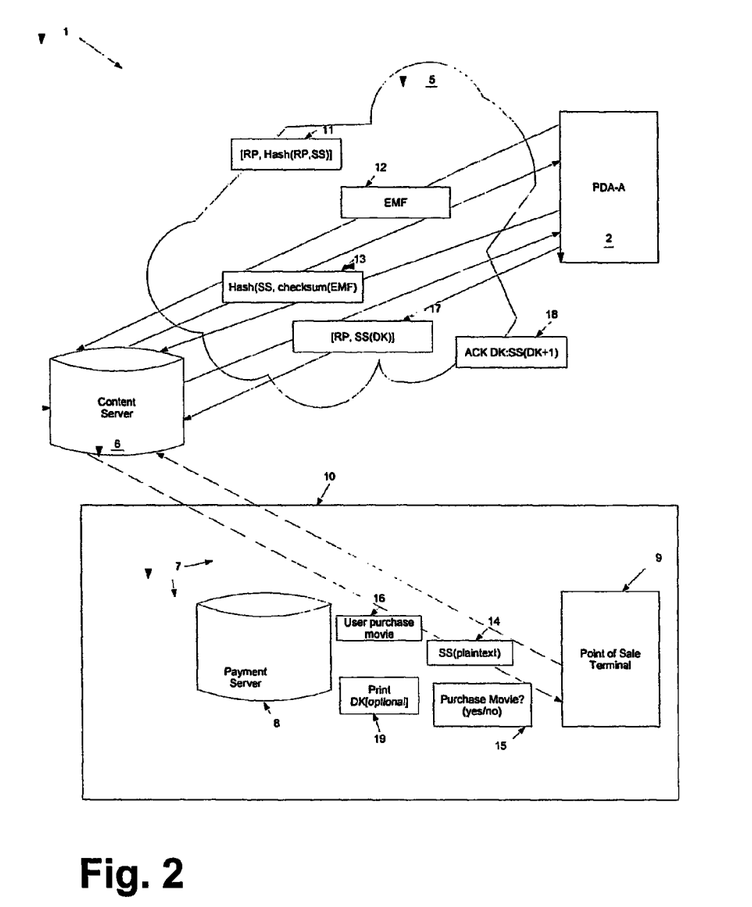
FIG. 2 is a diagram illustrating in general terms the system's method of operation.

FIG. 2 is a diagram illustrating in general terms the system's method of operation. As shown in FIG. 2, system 1 includes at least one PDA 2, a content server 6, a payment server 8, a point of sale terminal 9, an insecure communication channel 5 and a secure communication channel 7. Upon entry into the wireless range of system 1, the PDA 2 establishes a communication channel with the content server 6, and in one embodiment, the PDA 2 obtains a local IP address, via DHCP. Once the communications have been established and an IP address assigned to PDA 2, PDA 2 identifies itself by transmitting to the content server a concealed identifier. In this embodiment of the present invention, the identifier corresponds to a shared secret such as a credit card or user telephone number. As shown in operation 11, the concealment of the shared secret is accomplished by sending a hash of a random plain text (RP) generated by the PDA 2, and its shared secret (SS). In one embodiment, the PDA 2 simultaneously transmits the RP it generated and the hash[RP, SS].

In operation 12, the content server 6 transmits an encoded content to the PDA 2 via the insecure channel 5. In one embodiment, the content files stored on the content server 6 are pre-encrypted media files, hence the acronym "EMF." In addition, the content server 6 stores the value [RP,Hash(RP, SS)] in a table and associates this value with the transmitted encrypted file EMF or EK(MF) and its corresponding encryption key (EK) and decryption key (DK).

In operation 13, the PDA 2 transmits a hash of the shared secret and the checksum of the downloaded content (Hash [SS, checksum(EMF)]). This hash value is later used by the content server 6 to verify the complete download of the transmitted encoded file to the PDA 2.

In operation 14, the payment server 8 transmits the shared secret in a plaintext form to the content server 6, over the secure channel 7. In one embodiment, the shared secret is received from the user of the PDA 2 as part of a payment processing, e.g. swiping a credit card as a first step to making a payment for purchases.

The content server 6 uses the plaintext shared secret received to verify if a complete download of the encrypted content has been accomplished. In that pursuit, the content server 6 uses the SS to compute Hash[RP,SS] and compares it to entries in its lookup table, in order to locate the encrypted content (EMF) associated with the table entry Hash[RP,SS]. In one embodiment, the table entry may look like [RP, Hash (RP,SS)] and thus content server 6 computes and compares that entry. Once the appropriate encrypted content has been identified, the content server 6 computes the value Hash[SS, checksum(EMF)]. This value is referred to as the computed content download confirmation value. The computed content download confirmation value is next compared to the content download confirmation value received from the PDA 2. If the two values are equal, then the content download to the PDA 2 is successfully completed. If there was a successful download of the content to the PDA 2, the user is then prompted to purchase the downloaded content, in operation 15. In operation 16, if the user accepted the purchase and after the receipt of payment, the payment server 8 sends an authorization to the content server 6 to release the decryption key (DK) corresponding to the downloaded content. So, in operation 17, the content server 6 transmits via the insecure channel 5, to the PDA 2, the decryption key needed to decrypt the downloaded file. Since the transmittal is over the insecure channel, the content server 6 encrypts the decryption key using at least the shared secret and, optionally, the random plain text as the encryption key.

In operation 18, upon receipt of the decryption key, or upon the successful decryption of the decryption key and the subsequent decryption of the downloaded file, PDA 2 transmits an acknowledgment in an encrypted form, to the content server 6.

In an alternative embodiment, as shown in operation 19, the decryption key (DK) is sent to the point of sale terminal 9, via the secure channel 7, to be printed in a plaintext form on a receipt given to the user. However, this embodiment has some obvious disadvantages of being vulnerable to loss and being cumbersome, especially in the case of long decryption keys.

Figure 3:
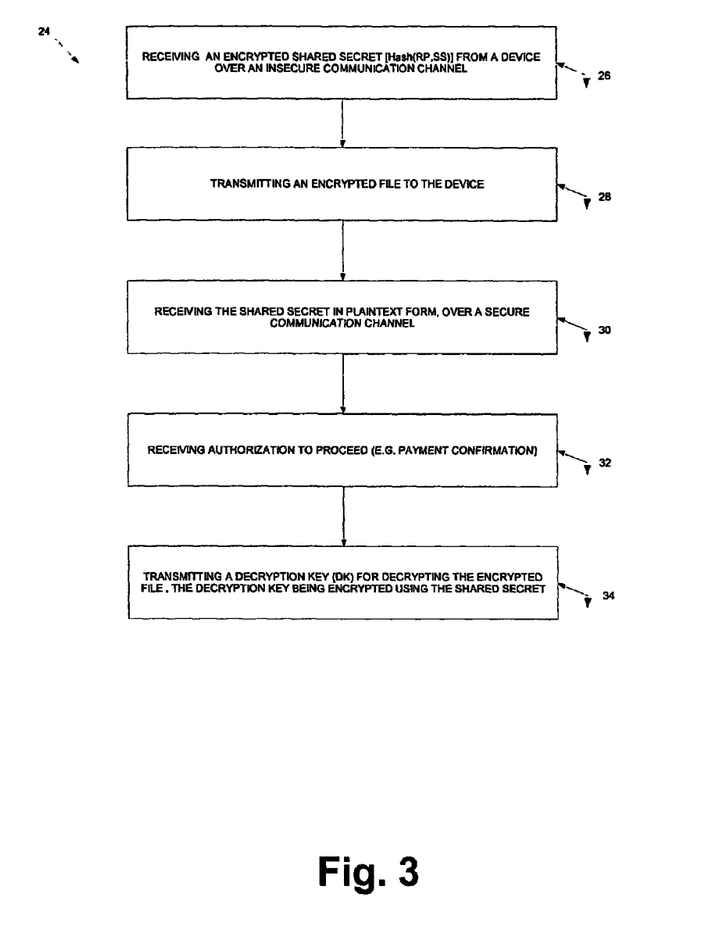
FIG. 3 is a flow chart of a method of transferring content and receiving payment from the point of view of a content server.

FIG. 3 is a flow chart 24 of a method of transferring content and receiving payment from the point of view of a content server. In one implementation of the teachings of the present invention, the PDA 2 identifies itself once it enters a local hotspot. As depicted in FIG. 2, in step 26, the content server 6 receives at least one identifier from the PDA 2 via the wireless network 5, upon entry into the hotspot range. For ease of use, the identifier may be the user's credit card number or alternatively the user's telephone number (used in cash transaction) which can be processed through a checksum algorithm (e.g., MD5 checksum). Since a particular user may have more than one credit card and/or telephone number, multiple identifiers may be used to identify a single PDA, a single user, and/or multiple users using a single PDA. These identifiers are entered into the PDA 2 and may be automatically transmitted to a content server 6 to be used as identifiers of the PDA 2.

Additionally, the present teachings do not require any assumptions of a secure communication channel existing between the PDAs 2-4 and the content server 6. Therefore, prior to transmission, the identifier is encoded, such as by an MD5 checksum algorithm as mentioned above, in order to minimize the chance of intruders capturing the sensitive information it represents. Since the identification information is used later in the process to help establish a secure communication means, each identifier is also referred to as a "shared secret" (SS), and these terms will be used interchangeably hereinafter. The term shared secret is used because in at least some implementations of the teachings of the present invention, the shared secret is used to encode some of the communications from the content server 6, or the payment server 8.

In one implementation of the present invention, the encoding of an identifier or shared secret is performed using a hash function. The hash function conceals the shared secret. However, a dictionary attack against such a hashing scheme is possible. Therefore, the SS is augmented by generating a random plaintext extension (RP) and appending it to the SS (shared secret or identifier) before applying the hash function.

Many encoding schemes may be used to protect the identification numbers. The following description is but one such technique that allows relative protection and should not be construed in any manner to be limiting the scope of the present invention. The hash of the augmented shared secret offers relative protection because it is not feasible for an intruder to launch a dictionary attack or other methods attempting to decode the hash function based on the augmented shared secret. Additionally, the random plain text generated by the PDA 2 is transmitted to the content server at same time as the transmission of the concealed shared secret or at some point shortly thereafter.

In step 28, the content server 6 transmits an encrypted file to the PDA or device 2. The encrypted file transmitted to the PDA 2 and its corresponding decryption key are associated with the received shared secret corresponding to PDA 2. In one embodiment of the present invention, a table is used to reflect the association between the PDA 2 and the transmitted encrypted file, by entering in the same row, the temporary IP address assigned to the PDA, the encoded PDA 2 identifier (the hash value), the random plain text transmitted by the PDA, and corresponding to this particular transaction, the encrypted transmitted file or some identifier of it, and the encryption/decryption keys corresponding to the transmitted file. This association table is further described in detail below with reference to FIG. 7. In an alternative embodiment, the encrypted file and its corresponding decryption key (DK) and encryption key (EK) may additionally be stored in a second table.

In one embodiment of the present invention, each of the files on the content server 6 that is available for transmission is pre-encrypted, requiring no encryption in real-time, reducing the load on the content server 6.

In step 30, the plaintext shared secret corresponding to PDA 2 is received over a secure communication channel 7. In one embodiment, the shared secret (SS) may be the credit card number used by the user to pay for a purchase at the particular hotspot (gas station or coffee shop). When the user swipes his credit card at the card reader associated with point of sale terminal 9, the shared secret (the credit card number swiped) is sent by the point of sale terminal 9 to the back end of the payment server 8 via an existing secure channel 7 that may be formed by the card reader cables and such. The payment server 8 in turn forwards the shared secret to the content server 6, in a plain text format, via a secure channel 7 previously established between the content server 6 and the payment server 8.

In step 32, the content server 6 receives a payment confirmation from the payment server 8, affirming that the user has accepted the downloaded content and paid for it. This payment confirmation signals the content server 6 to release the decryption key (DK) necessary corresponding to the paid for, encrypted, downloaded file to the PDA 2.

So, in one implementation of the teachings of the present invention, in step 32, the content server 6 encrypts the decryption key using the shared secret (SS). This way, the decryption key may be transmitted to the PDA 2 directly in step 34, over the wireless network, without the risk of an intruder capturing the plaintext decryption key. In an alternative embodiment, the encryption of the decryption key may be based on at least the shared secret and, optionally, the random plain text previously generated by the PDA 2, and transmitted to the content server 6. In yet another implementation of the present invention, the content server 6 may transmit the decryption key in a plaintext format to the payment server, which in turn forwards the decryption key to the point of sale terminal 9, which in turn prints the decryption key on the user's receipt. However, this alternative may be less desirable because of problems such as risk of loss of the receipt and the decryption key on it, as well as the difficulties of accurately entering a large random decryption key into the PDA.

Figure 4:
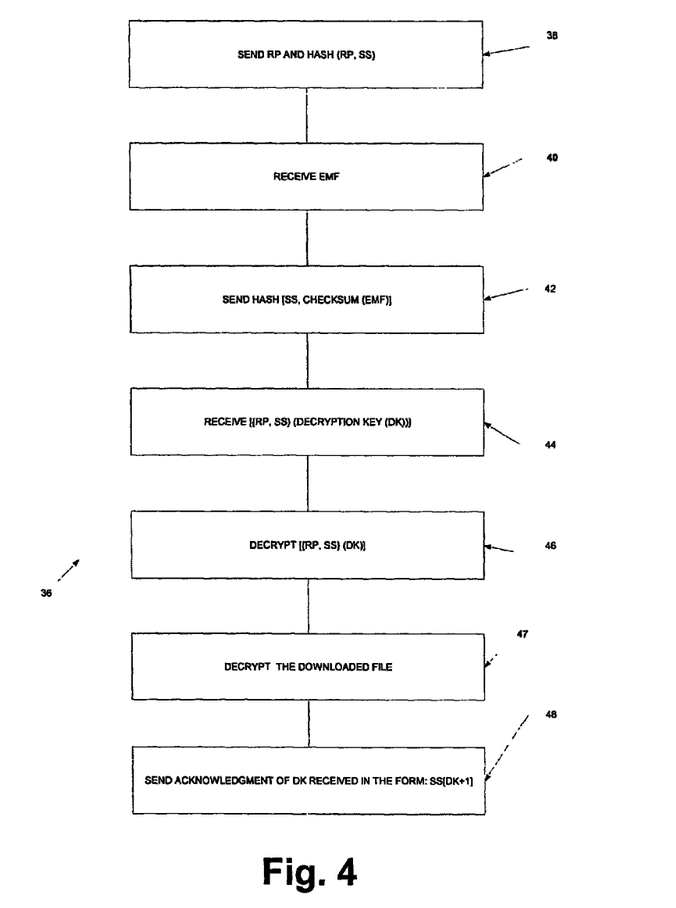
FIG. 4 is a flow chart of the method of receiving content from the point of view of a remote device (e.g. PDA).

FIG. 4 is a flow chart of the method of receiving content from the point of view of a remote device (e.g. PDA). As previously described, a representative PDA includes a mobile computing device such as personal digital assistant (PDA) 2 which is configured with communications capabilities including wireless digital communication capabilities. In the discussion to follow, the term "PDA" will be used to represent all matter of communications devices including wireless communications devices. PDA 2 can be a thin-client PDA with specialized functionality limited to practice at a minimum the present teachings. PDA 2 can also be a thick-client PDA with enhanced functionality including enhanced memory and processing capabilities. Additionally, the PDA 2 would have storage capability to accept and store the downloaded files. PDA 2 can also be a personal computer or a cellular telephone with appropriate memory and processing functions.

PDA 2 is configured to wirelessly communicate with the content server 6. In one embodiment, the content server 6 may contain within it many multimedia files that can be made available to PDA 2 through file downloads. As shown in FIG. 4, upon entry into a hotspot, the PDA 2 first identifies itself to the content server 6 by transmitting an identifier. In one implementation of the present invention, the identifier is a shared secret, such as a credit card number of the user, or his telephone number. The identifier is called a shared secret because according to the present teachings, the PDA 2 and the content server 6 may use the shared secret in a similar way as a secret key in encryption systems. Information encrypted by one may be decrypted by the other if the encryption is based on the shared secret. A single PDA may be associated with several shared secrets corresponding to multiple credit card and phone numbers used by a user or several users sharing the PDA. In one implementation, the PDA 2 transmits all its shared secrets to the content server 6 because at this stage of the process the PDA 2 cannot predict which shared secret may be used by its user in the process of the payment transaction, as described further below.

In the more general implementation of the present teachings, no assumptions are made about the security of the wireless communication channel established between the PDA 2 and the content server 6. Therefore, in step 38, the PDA 2 transmits a concealed shared secret in order to protect the information transmitted. In one implementation of the present invention, the concealment of the shared secret is accomplished through the use of a hash function. However, a dictionary attack against the hash of the shared secret is theoretically possible. Therefore, in one embodiment, the PDA 2 generates a random plain text, added to shared secret as an addendum, and the combined value is then hashed. This augmented encoded identifier is less vulnerable against snooping by intruders.

Other methods of encoding or concealing the shared secret are possible and may be substituted for the hash function without departing from the scope and the spirit of the present invention.

In step 40, the PDA 2 receives an encoded file, transmitted from the content server 6. As previously discussed, the selection of the particular file or files to be download to the PDA 2 may be based on a query from the PDA 2, based on the availability of the files on the content server 6, based on some customer preference history, or based on a marketing or promotional scheme. The type of file stored on the content server 6 may also vary based on the particular embodiment of the present invention. In one embodiment, the files stored on the content server 6 are media files, including both video and audio component that may be downloaded separately. Hence the use of the acronyms encoded media file (EMF). Encoded file (EF) and encoded media file (EMF) are used interchangeably throughout this document to refer to the same basic example of a file object. Additionally, the files may be encoded with progressive quality such that a file may be usable even if it is only partially downloaded. For instance the audio and video content of a file may be encoded at multiple quality levels such that larger prefixes of the file are of better quality than smaller prefixes. Because prefixes of a file may contain meaningful progressively encoded content, an embodiment of the present invention enables the downloading of an entire content in several sessions and at multiple wireless access points.

In at least one embodiment of the present invention, the file download is a fee based service and thus the downloaded EMF file in step 40 is unusable until its corresponding decryption key has been received in exchange for payment for the file.

In step 42, the PDA 2 sends a hash of the shared secret and the checksum of the encoded file. In one embodiment of the present invention, a checksum is used as part of identifying and authenticating a file. In this implementation, the PDA transmits the hash of the checksum of the encoded file to be used by content server 6 in a later operation to verify the complete download of the transmitted file. Only the authorized PDA knows the shared secret, so the content server 6 can verify that the complete message is authentic (see description of FIG. 5 herein below). At this time, the content server 6 saves the communicated message in its table of completed file transfers.

The PDA 2 message may be in the form:
PDA →content server: Hash(SS, checksum(EMF)),
where:
SS: is the plaintext shared secret
EMF or EF: is the encoded media file (EMF) or simply the encoded file (EF), and
checksum: is a file authentication scheme such as an MD5 checksum routine.

The PDA cannot decode the file it has just received and thus the checksum is only based on the encoded file version. Means of verifying a file downloads other than a checksum, such as an MD5 checksum, may be used to verify a complete file download.

In another implementation of the present invention, a user can visit a specific web site and download checksums that correspond to media files of interest. Alternatively, a user can identify media files of interest at a neutral third-party content site where checksums can be downloaded. Indeed, checksums can be intermediately downloaded onto a desktop computer and later loaded onto a PDA. With these authenticating checksums, directory service tasks to be described below can be simplified.

In step 44, the PDA 2 receives an encrypted decryption key (EDK) encoded using at least the shared secret and, optionally, the random plain text generated by the PDA 2 and previously transmitted to the content server 6. In an alternative embodiment, the decryption key may be encrypted using only the shared secret.

In step 46, the PDA 2 uses the decryption key based on at least the shared secret and, optionally, the random plain text, if previously used, for decryption. In step 47, using the decryption key (DK), the PDA 2 decrypts the encrypted file downloaded from the content server 6.

To determine the key, the PDA 2 has to know which SS the user used at the point of sale terminal 9, since the user may have more than one shared secret (more than one credit cards, or telephone numbers or both). The PDA 2 must enumerate these to determine which one was used for this transaction. As previously disclosed, the PDA 2 generates RP. Therefore, the content server 6 does not have to send RP to the PDA 2. An exemplary algorithm for the PDA 2 to determine the SS used by the user may be as follows:
for each SS(i)
extract DK using RP, SS(i)
apply DK (MF)
if garbage, then next key.

This assumes there exist a known plain text in the file (MF). In the case where the downloaded content is a media file, an AVI header may be used. Alternatively, a user readable title or some random plaintext message such as the one herein below may be used:
SS(DK, "this the one").

In step 48 the PDA 2 transmits a modified decryption key to the content server 6 as an acknowledgment that the decryption key (DK) has been received and successfully decrypted. The PDA's 2 acknowledgement of the receipt of the decryption key may be as follows, e.g.:
PDA →content server: SS (DK+1).

This lets the content server 6 know that the PDA 2 received the decryption key (DK), and verifies that this PDA 2 sent the acknowledgment and not a third party.

Repudiation is still possible if the PDA 2 does not send an acknowledgment but has the key. To resolve this problem, a well known technique such as a "bit commitment" scheme may be used.

Figure 5:
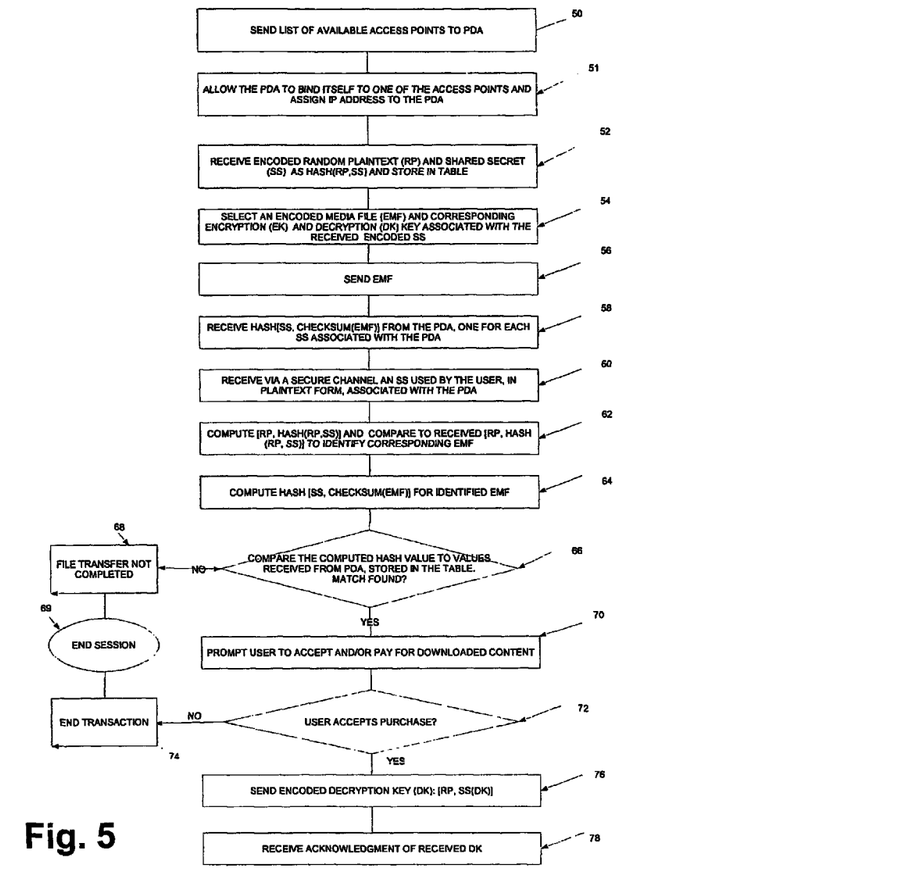
FIG. 5 is a flow chart of the method of FIG. 3 in greater details.

FIG. 5 is a flow chart of the method of FIG. 3 in greater details. In one implementation of the present invention, the content server 6 contains within it many multimedia files that can be made available to PDAs 2-4 through file downloads. In an embodiment of the present invention, content server 6 is not authenticated by PDA 2 such that authentication is performed after the download is complete. In this way, untrusted content server 6 need not perform any authentication tasks at the beginning of a download.

In step 50, the PDA 2 that has just entered into the hotspot communication range receives a list of available access points (APs). In an implementation of the present teachings, each of the PDAs 2-4 is configured to continually seek access points, and when one is encountered, each PDA 2-4 is further configured to attempt to gain access to the network provided by such access point. Moreover, in an implementation of the present teachings, upon finding an access point, each PDA 2-4 acquires an Internet Protocol (IP) address via DHCP. The PDAs 2-4 can further be configured to obtain other networking information such as a default gateway.

As shown in FIG. 5, in step 52, the content server 6 receives an encoded shared secret (SS) in the form of a hash function of the shared secret and a random plain text (RP) as shown below:

PDA →Content server 6: RP, Hash[RP, SS].

The random plain text is generated by the PDA 2 and may be unique to each session. The content server 6 stores the received encoded shared secret in a table to be used partially as an identifier of the particular PDA 2. Alternatively, the PDA 2 may send multiple encoded shared secrets to the content server 6, all of which are associated with the corresponding PDA. In one embodiment, the assignment uses the local Internet Protocol (IP) address assigned to the PDA 2 as a possible common link.

In one implementation of the present invention, the random plain text (RP) generated by the PDA is transmitted to the content server 6 along with the hash of the combination (SS, RP).

In step 54, the content server 6 will select an encoded content/file (EF) or an encoded media file (EMF), for transmission to the PDA 2, along with its corresponding encryption key (EK) and decryption key (DK).

As previously disclosed, the selection of a particular file for download may be based on an inquiry from the device 2, based on purchase history, or other marketing information available to and directing the content server 6. The content server 6 applies the necessary criteria to select the file or files to download to the user's PDA 2-4. Of course, at this stage of the process, the only identification of the PDA 2 may be based on the encoded shared secret, which may not reveal the user of the PDA 2 and his buying habits. Thus, the file or content presented to the PDA 2 may be based solely on the file server's 6 chosen criteria.

In one implementation of the present invention, the content server 6 pre-encrypts the content stored on it. The content server 6 then chooses an encryption key from a set of encryption keys that have been used to generate the encrypted files. So, for each [RP, Hash (RP, SS)], the content server associates:

[RP, Hash (RP, SS)]→[EK,EK(MF)]

where:

RP is the random plain text generated by the PDA 2,

SS is one of the shared secret identifying the PDA 2,

EK is the encryption key corresponding to the transmitted file,

MF or F stands for the transmitted media file or simply file, and

EK(MF) or EMF stands for encoded media file.

The pre-encryption of the files stored on content server 6 minimizes its load during operation. In this implementation, the content server 6 stores the encoded files along with their corresponding encryption and decryption keys in various cells of a table, and associate each file with the corresponding EK and DK.

In step 56, the content server 6 sends the selected content to the PDA 2.

In step 58, the content server 6 receives from the PDA 2, via the insecure channel 5, an encoded content download verification value, also referred to as the received content download confirmation value. In one implementation, the content download confirmation value is encoded using a hash function of the shared secret along with a checksum of the encoded and transmitted content as previously disclosed and as shown below. The PDA 2 message may be in the form:

PDA → content server: Hash (SS, checksum(EMF)).

At this stage of the process, the content server 6 does not have the plaintext shared secret used in the hash function and thus it cannot decipher or use the received hash function of the content download confirmation value for verification of a complete file download. In one embodiment, the content server 6 may associate the received encoded content download verification value to the appropriate PDA 6 based on its IP address, and store the encoded content download verification value in the table. However, only the authorized PDA 2 knows the shared secret (SS), so the content server 6 can verify (in step 66), that the content download verification message is authentic.

In step 60, the shared secret "SS" is received in a plaintext form, by the content server 6, from the payment server 8, via the secure channel 7. The plaintext of the shared secret (SS) as used herein refers to the unencrypted or unencoded value of the shared secret. For example, in the case where a credit card is used as the shared secret, the plaintext of the shared secret (SS) or simply the plaintext refers to the unencrypted or unencoded credit card number. In the case of a cash transaction, the SS may be a user telephone number. At some point in the transaction, the user is prompted to enter his phone number or swipe his credit card at the point of sale terminal 9. The point of sale terminal 9 may be a gas pump credit card reader in a gas station, or the credit card reader associated with a coffee store cash register. The plaintext of the shared secret is transmitted over the secure channel 7. The secure channel 7 connects the point of sale terminal 9, the payment server 8 and the content server 6 together. The secure channel may be the cabling and credit card reader connected to the back end payment system and associated with a pay station or point of sale terminal 9.

In one implementation of the present invention, when the user swipes his credit card at the point of sale terminal 9, the credit card number (used by his PDA 2 as a shared secret) is captured and transmitted to the content server 6.

Alternatively, a secure channel may be created by the use of decryption, decoding and other means of concealing and protecting communications from intruders.

In step 62, the content server 6 computes the concealed identifier it previously received from the PDA 2. In the exemplary embodiment of the invention herein, the content server 6 computes the hash of the random plain text (RP) previously received, along with the shared secret to form Hash[RP,SS]. This hash value is then compared to each of the hash values previously received and stored in its lookup table and corresponding to the particular PDA 2. In one embodiment, the RP may be sent from the PDA 2 to the content server 6 at the same time as the concealed identifier (Hash[RP,SS]). Therefore, the table entry may be [RP,Hash(RP,SS)]. If a match is found, then the content server 6 finds the corresponding encoded file transmitted to this particular PDA 2. Each PDA may have several shared secrets associated with it, and at the beginning of the transaction, it cannot predict which of the shared secrets the user will use in this transaction. Therefore, in one implementation, the PDA 2 transmits each of its corresponding shared secrets to the content server 6. Once the user uses a particular shared secret as part of the payment transaction, the content server has to identify which of the encoded shared secrets correspond to the plaintext shared secret used by the user and received via the secure communication channel 7. One algorithm used for this determination may be as follows:

For each entry in the table of [RP, Hash (RP,SS)],
take the plain text RP, concatenate it with SS
generate the Hash (RP, SS)
if (Hash (RP, SS) matched the table entry) extract encryption key EK from the entry

[RP, Hash (RP, SS)→[EK, EK (MF)].

where EK(MF) or EMF is the encoded file or media file.

In step 64, the corresponding encoded content is used to compute a hash of the shared secret (SS) and the checksum of the encoded transmitted file (EMF)(also referred to as the calculated file download confirmation value):

Hash [SS, checksum (EMF)].

In step 66, the content server 6 compares its table of completed content transfers to see if the computed content download confirmation value (hash [SS, checksum (EMF)]) matches the received content download confirmation value. If a match is found, then the content server 6 determines that the PDA 2 has received the downloaded content completely and accurately. In step 68, in the case where the computed hash value does not match any entry in the completed download table of the file server 6, the content server 6 determines that the content download was not complete, and ends the process at step 69. This condition is further addressed in the aforementioned related applications, herein incorporated by reference for all purposes.

The process continues in step 70 after the verification of a successful and complete download. The content server 6 then causes the user to be prompted to accept and pay for the successfully downloaded content. In step 72, if the user accepts to purchase the downloaded content, he will be prompted for payment by the payment server 8 which in turns sends a confirmation of payment to the content server 6 (see FIG. 3, step 32). The confirmation of payment acts as an authorization to the content server 6, to release the decryption key necessary for the PDA 2 to decrypt and use the downloaded content.

In step 74, if the user responds negatively to the purchase option, the process ends at step 69.

In an alternative embodiment, the content server 6 communicates with the PDA 2 and causes it to prompt the user for the purchase of the downloaded content/file.

In step 76, after having received a payment confirmation through the payment server 8, the content server 6, encrypts the decryption key (DK) corresponding to the downloaded encrypted file using the combination of the random plain text and the shared secret. We note that at this point, a shared secret (SS) has been established between the PDA 2 and the content server 6. So, the content server 6 can encode DK using an extended key {RP,SS}, as follows:

content server→ PDA: [{RP,SS}(DK)].

In one embodiment, DK is encrypted only with SS as its decryption key. In an alternative implementation, the DK's encryption key is based on the random plain text RP and the shared secret SS. In either implementation, the encrypted DK is transmitted to the corresponding device, PDA 2.

As previously disclosed, the PDA 2 may use an algorithm to determine which of the multiple shared secrets associated with the PDA 2 was used by the user.

In an alternative implementation, DK is sent in a plaintext form to the payment server 8 through the secure channel 7, and then forwarded to the point of sale terminal 9 to be printed on the user's receipt.

In step 78, the content server 6 receives an acknowledgment of the receipt of DK from PDA 2 (see FIG. 3). The PDA 2 should acknowledge the receipt of the decryption key, e.g.:

PDA → content server: SS(DK+1).

This lets the content server 6 know that the PDA 2 received the decryption key (DK), and verifies that PDA 2 has sent the acknowledgment and not a third party.

Repudiation is still possible if the PDA 2 does not send an acknowledgment but has received the decryption key. To resolve this problem, a well known technique such as a "bit commitment" scheme may be used.

Figure 6:
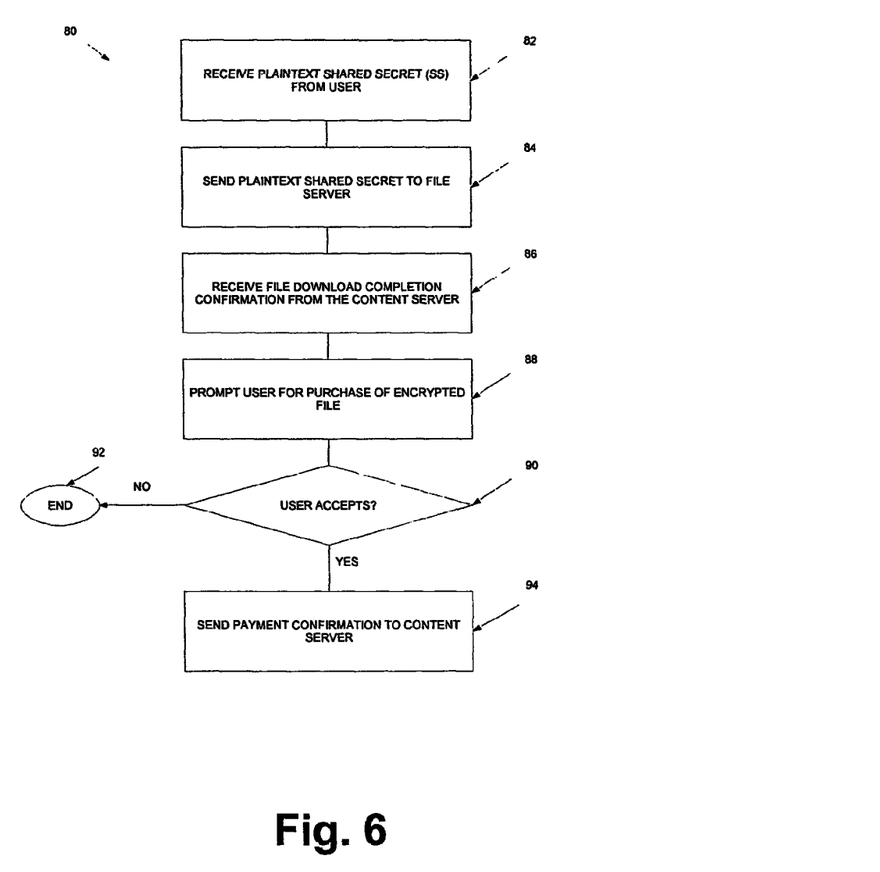
FIG. 6 is a flow chart of the method processing authorization/payments from the point of view of a payment server.

FIG. 6 is a flowchart 80 of the operation of a payment server 8 according to one embodiment of the present invention. In one implementation of the present invention, the payment server 8 is brought into the process when the user swipes his credit card to begin the purchasing process. For example, once a user enters into a gas station (example of a hotspot), he first swipes his card, before he can initialize the gas pump and begin the pumping of gas. In step 82, once the card reader associated with the point of sale terminal 9 reads the credit card number, the payment server 8 receives the credit card number in a plaintext form. The PDA 2 having entered the hotspot zone has already communicated this credit card number as a shared secret to the content server 6 in a concealed form. The assumption is that a secure channel exists between the point of sale terminal 9, the payment server 8 and the content server 6.

Therefore, in step 84, the payment server 8 securely sends the plaintext shared secret (SS) to the content server 6 using this existing secure communication channel 7.

In step 86, the payment server 8 receives notification from the content server 6 that a successful file download to the PDA 2 has been verified by the content server 6.

In one implementation of the present invention, in step 88, the content server requests the payment server 8 to prompt the user through the point of sale terminal 9 for the purchase of the downloaded file. In an alternative embodiment, the payment server initiates the prompting of the user automatically upon the receipt of the confirmation of a successful file download to the user's PDA 2. In yet another implementation, the content server 6 signals the PDA 2 directly to prompt the user and the payment server 8 is not involved.

In step 90, the payment server 8 receives the user's decision to purchase or not to purchase the downloaded file. In an alternative implementation, where the user is prompted through his PDA 2, his response may be received by the PDA 2, transmitted first to the content server 6, which forwards the response to the payment server 8 for payment processing. If the user's decision was negative on the purchase of the downloaded content, the file download and payment process ends in step 92, as related to the payment for the downloaded content.

However, if the user's decision to purchase the downloaded content is affirmative, in step 94, the payment server 8 receives and processes the payment from the user through the point of sale terminal 9, and subsequently notifies the content server 6 to release the decryption key corresponding to the paid for downloaded file.

Figure 7:
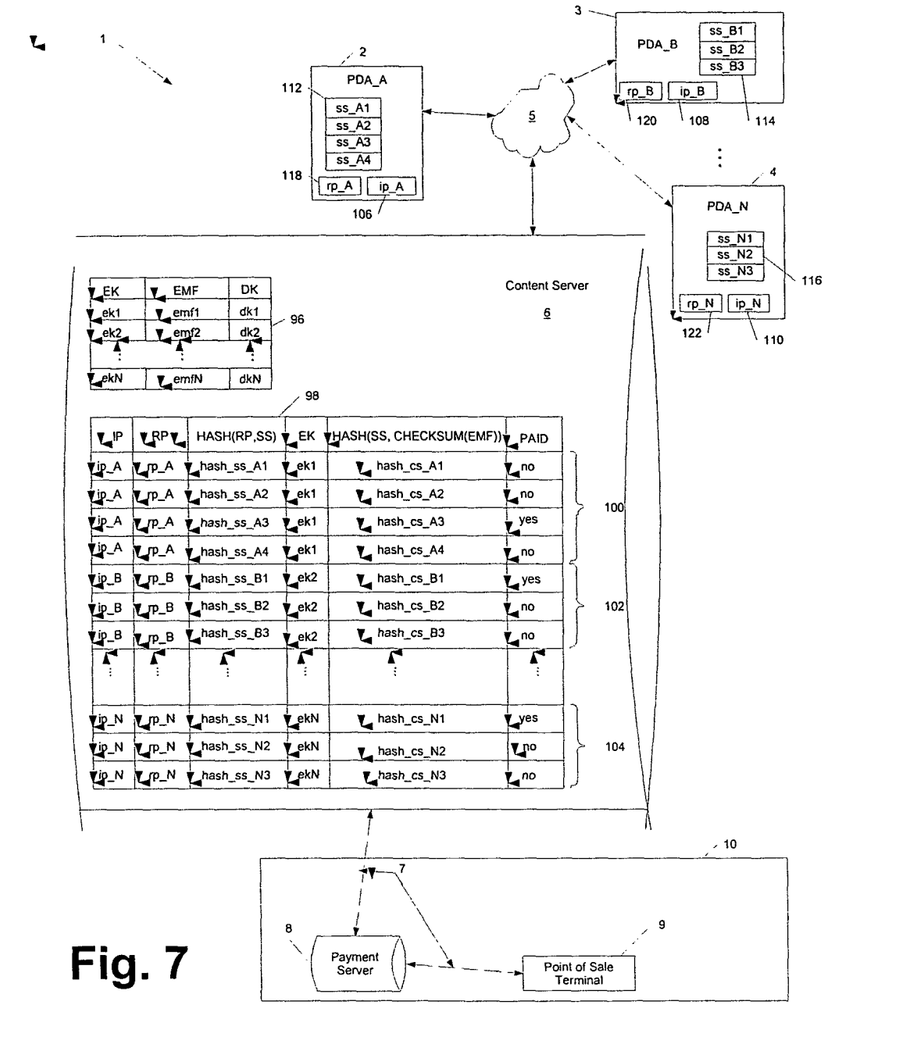
FIG. 7 illustrates data structures in the system of FIG. 1 and operations corresponding thereto.

FIG. 7 is a system according to one embodiment of the present invention. FIG. 7 shows a block diagram illustrating an embodiment of the system 10 of FIG. 1, wherein the content server 6 further includes tables 96 and 98. Each entry of table 96 is a pair of an encryption key (EK) and an encrypted file (EMF) that was encoded using the encryption key and to be transmitted to the PDA 2.

The numeral 100 represents that the information in the first four rows of table 98 are related to the PDA 2, assuming that PDA 2 has only 4 shared secrets as shown in table 112. For the purpose of illustration, the PDA_B 3 and PDA_N 4 are assumed have 3 shared secrets as illustrated in tables 114 and 116. The numeral 102 and 104 refer to the information related to PDA_B 3 and PDA_N 4, respectively. Hereinafter, the description of the table 98 is limited to PDA 2 for simplicity.

The P DA 2 has an IP address 106 that is associated with a hotspot where the PDA 2 is located for file transfer and sent to the content server 6. The first column of the table 98 represents the received IP address of PDA 2 which is used in communication between the PDA 2 and the content server 6. The IP address 106 can be changed when the PDA 2 enters into another hotspot. The IP addresses 108 and 110 correspond to the PDA 3 and 4, respectively.

A random plaintext (RP) 118 is generated by PDA 2 prior to transmitting its concealed identifiers to the content server 6. Alternatively, a random plain text 118 may be generated for each shared secret to be transmitted to the content server 6. Thus, even though the PDA 2 can open more than one file transmission session, only one random plaintext 118 is shown for simplicity. The random plaintexts 120 and 122 are generated by the PDA_B 3 and PDA_N 4, respectively. The second column of the table 98 shows the random plaintexts sent to the content server 6 by PDA 2.

The hash of the random plaintext 118 is used to conceal the shared secrets 112. In one embodiment, each shared secret 112 is encoded using a hash function HASH(RP, SS) and sent to the content server 6. The third column of the table 98 represents the encoded shared secrets. For convenience, the hash function HASH(RP,SS) is assumed to be the encoding method hereinafter.

Once the content server 6 receives a set of HASH(RP,SS) values, one of the encryption keys (EK) is assigned to each HASH(RP,SS) value and shown in the fourth column of table 98. Also, using the table 96, an encrypted file (EMF) associated with the assigned encryption key is selected and transmitted to the PDA 2 wherein the association can be determined by the IP address as shown in the first column of table 98. Upon transmission of the encrypted file EMF, the PDA 2 calculates a file download confirmation value (previously referred to as the received file download confirmation value) which indicates the integrity of the downloaded encrypted file (EMF). In one embodiment, the MD5 checksum method is used in the calculation. The calculated checksum, checksum (EMF) is encoded with each of the shared secrets in table 112. Each encoded checksum, represented as HASH(SS, CHECKSUM(EMF)), is sent to the content server 6 which is shown as fifth column of table 98.

Once the content server 6 receives a payment confirmation of the transmitted encrypted file (EMF) through the secure channel 7, it populated the sixth column of table 98, represented as "PAID." Then, the content server 6 selects a decryption key (DK) associated with the encryption key (EK) in table 96, and encrypts the selected decryption key before sending to the PDA 2.

Among other things, the present teachings address the download and payment processes between untrusted, unknown parties without the need for a certification authority. Whereas certain embodiments have been described, one of skill in the art will understand that many variations are possible and indeed desirable.

We claim:

1. A method for facilitating content downloads via an insecure communications channel, comprising:
   receiving at a content server via an insecure communications channel at least one shared secret from a device, wherein the at least one shared secret is received in encoded form that functions as an identifier of the device;
   transmitting encrypted content via the insecure communications channel from a content server to the device;
   receiving at the content server the shared secret in plaintext form via a secure communications channel;
   receiving a confirmation authorizing release of a decryption key;
   encrypting the decryption key before sending it to the device, wherein the decryption key is encrypted using the shared secret or a random plaintext secret received from the device; and
   sending the decryption key for decryption of the encrypted content to the device.

2. A method as recited in claim 1, wherein the confirmation is based on payment for the transmitted encrypted content.

3. A method as recited in claim 1, wherein the shared secret identifies a user, the device, or both.

4. A method as recited in claim 1, wherein the shared secret is a credit card number or a phone number.

5. A method as recited in claim 1, further comprising:
   receiving from the device an acknowledgement indicating receipt of the decryption key.

6. A method as recited in claim 1, wherein the decryption key is sent to the device via the insecure communication channel.

7. A method as recited in claim 1, wherein the decryption key is sent in plaintext form to a point of sale terminal via the secure channel.

8. A method as recited in claim 1, wherein the shared secret is encoded by a hash function of a combination of the shared secret and the random plaintext.

9. A method as recited in claim 1, further comprising:
   receiving from the device a content download confirmation value that is encoded with the shared secret.

10. A method as recited in claim 9, wherein the content download confirmation value is based on an MD5 checksum.

11. A method as recited in claim 9, wherein the content download confirmation value is based on a calculation using the shared secret.

12. A method as recited in claim 9, wherein the step of receiving confirmation further comprises:
   receiving a random plaintext from the device;
   receiving a hash of the shared secret and the random plaintext for each shared secret; computing a hash of the shared secret with the random plaintext to produce a cyphertext for each shared secret;
   comparing the cyphertext to each of the received hash of each of the shared secrets; and in the case of a match,
   identifying the corresponding transmitted encoded content,
   encoding a content download confirmation value for the transmitted encoded content using the shared secret; and
   comparing the computed content download confirmation value to the received content download confirmation value to verify a complete content download.

13. A method as recited in claim 12, further comprising:
   after verification of the complete content download, causing a prompt to be sent to a user of the device to purchase the downloaded content; and
   receiving a confirmation of receipt of payment.

14. A method as recited in claim 1, wherein content stored in the content server is encrypted prior to a start of a download process.

15. A method for downloading content from a content server over an insecure communications channel, comprising:
   sending a shared secret in an encoded form to a content server via an insecure communications channel;
   downloading from the content server an encrypted content via the insecure channel;
   sending an encoded content download confirmation value to the content server via the insecure communications channel, wherein the encoded content download confirmation value is encoded with the shared secret;

receiving a decryption key in an encrypted form from the content server via the insecure communications channel, wherein the decryption key is encrypted using the shared secret;

decrypting the downloaded decryption key using the shared secret;

decrypting the downloaded encrypted content using the decryption key; and sending an acknowledgement of the received decryption key.

16. The method of claim 15 further comprising:

providing an indicia of acceptance of terms of the download and decryption of the encrypted content by the user, wherein the indicia is an indication of acceptance of payment.

17. A method of authorizing a release of a decryption key corresponding to a downloaded content, comprising:

receiving from a user via a secure channel a shared secret in a plaintext form;

sending the shared secret to a content server in the plaintext form, wherein the content server previously received the shared secret in encoded form;

receiving a confirmation of successful encrypted content download from the content server;

after receiving the confirmation of successful encrypted content download from the content server, prompting the user to accept terms of download and decryption of the encrypted content; and after receipt of an indicia of such acceptance, sending an authorization to the content server to release a decryption key for decrypting the downloaded encrypted content. wherein the content server encrypts the decryption key before sending it to a device of the user, and the decryption key is encrypted using the shared secret or a random plaintext secret received from the device.

18. A system for transmitting a file to a device, comprising:

a content server operative to store a plurality of content files, to wirelessly transmit the content files via an insecure channel, and to communicate with via a secure channel;

one or more remote devices operative to transmit and receive communications to and from the content server over the insecure channel including anyone of the content files in encrypted form, each device including a processor to manage the communications as well as encryption and decryption of communicated data;

a point of sale terminal operative to communicate with a user associated with any of the devices; and a payment server communicatively disposed between the point of sale terminal and the content server, and communicating therewith via the secure channel, further operative to provide a shared secret in plaintext form via the secured channel from the user to the content server, wherein the content server is further operative to release a decryption key to one of the devices upon receipt of confirmation from the payment server that the user of the device accepted terms of download and decryption of a content file, wherein the decryption key is encrypted using the shared secret.

19. A computer readable program embodied on a non-transitory computer readable medium for facilitating content download from a content server to a device via an insecure communications channel, comprising code to:

receive a shared secret in an encoded form from a device, the encoded shared secret functioning as a device identifier;

transmit content in an encrypted form to the device;

receive the shared secret in plaintext form via a secure channel;

receive a confirmation authorizing the release of a decryption key for the transmitted encrypted file;

encrypt the decryption key before sending it to the device, wherein decryption key is encrypted using the shared secret or a random plaintext secret received from the device; and send the decryption key to the device for decrypting the transmitted encrypted file for which the payment confirmation has been received.

20. The computer program embodied on a non-transitory computer readable medium of claim 19 wherein the confirmation is sent upon payment by a user of the device for the downloaded content.

21. A computer readable program embodied on a non-transitory computer readable medium for downloading content from a content server, over an insecure communications channel, comprising code to:

send a shared secret in an encoded form to a content server;

receive from the content server an encrypted content;

send an encoded content download confirmation value to the content server, wherein the encoded content download confirmation value is encoded with the shared secret;

receive an encrypted decryption key from the content server, wherein the decryption key is encrypted using the shared secret;

decrypt the encrypted decryption key using the shared secret;

decrypt the downloaded encrypted content using the decryption key; and send an acknowledgement of the received decryption key.

22. The computer readable program embodied on a non-trasitory computer readable medium of claim 21 wherein the code is to:

provide an indicia of acceptance of terms of the download and decryption of the encrypted content by the user, wherein the indicia is an indication of acceptance of payment.

23. A computer readable program embodied on a non-transitory computer readable medium for authorizing a release of a decryption key corresponding to a downloaded content, comprising code to:

receive a shared secret in a plaintext form from a user, via a secure channel;

send the shared secret to a content server in the plaintext form, wherein the content server previously received the shared secret in encoded form;

receive a confirmation of successful encrypted content download from the file server;

prompt the user to purchase the downloaded encrypted content after receiving the confirmation of successful encrypted content download from the content server; and after receipt of payment, sending an authorization to the content server to release a decryption key operative to decrypt the downloaded encrypted file, wherein the content server encrypts the decryption key before sending it to a device of the user, and the decryption key is encrypted using the shared secret or a random plaintext secret received from the device.

24. A method of facilitating content download via an insecure communications channel, comprising:

receiving a concealed identifier from a device wherein the concealed identifier identifies the device;

transmitting an encrypted file to the device via an insecure channel, wherein the encrypted file has a corresponding decryption key;

receiving the identifier in an unconcealed form over a secure channel;

receiving an authorization from a payment server over the secure channel;

encrypting the key using the identifier; and transmitting the encrypted key to the device.

25. A method for payment of file downloads to a wireless device, comprising:

receiving a concealed identifier from a device, wherein the identifier corresponds to the wireless device;

transferring a selected encrypted file to the wireless device, wherein the selected file is encrypted using a key;

receiving the identifier in an unconcealed form over a secure channel as part of a payment transaction;

using the identifier to encrypt the key; and transmitting the encrypted key to the wireless device after receipt of payment.

26. A system for transmitting content via an insecure communications channel, comprising:

a content server including hardware to:

receive a shared secret in an concealed form, from a wireless device via a wireless network, wherein the shared secret identifies the device;

transfer a selected content in an encrypted form to the device, wherein the selected file has a corresponding decryption key;

receive the shared secret in an unconcealed form over a secure channel as part of a payment transaction;

use the shared secret to encrypt a decryption key; and transmit the encrypted decryption key to the wireless device after receipt of payment.

27. An apparatus for content download to a device via an insecure channel comprising hardware to:

receive at least one identifier from a device, wherein the identifier is concealed and identifies the device;

transmit an encrypted file to the device;

receive the at least one identifier in an unconcealed form over a secure channel;

encrypt a decryption key before sending it to the device, wherein the decryption key is encrypted using the at least one identifier or a random plaintext secret received from the device; and transmit after receipt of an authorization, the encrypted decryption key to the device, wherein the decryption key is for decrypting the encrypted file.

* * * * *

UNITED STATES PATENT AND TRADEMARK OFFICE
CERTIFICATE OF CORRECTION

| | | |
|---|---|---|
| PATENT NO. | : 8,464,353 B2 | Page 1 of 1 |
| APPLICATION NO. | : 10/679092 | |
| DATED | : June 11, 2013 | |
| INVENTOR(S) | : David Andrew Thomas et al. | |

It is certified that error appears in the above-identified patent and that said Letters Patent is hereby corrected as shown below:

In the Claims

In column 17, line 31-32, in Claim 17, delete "content." and insert -- content --, therefor.

In column 18, lines 35-36, in Claim 22, delete "non-trasitory" and insert -- non-transitory --, therefor.

Signed and Sealed this
Twenty-sixth Day of November, 2013

Margaret A. Focarino
*Commissioner for Patents of the United States Patent and Trademark Office*